F. G. PALMER,
Assignor of one-half to J. J. PALMER, and said J. J. PALMER assignor to said F. G. PALMER.
Lamp.
No. 9,592. Reissued March 1, 1881.
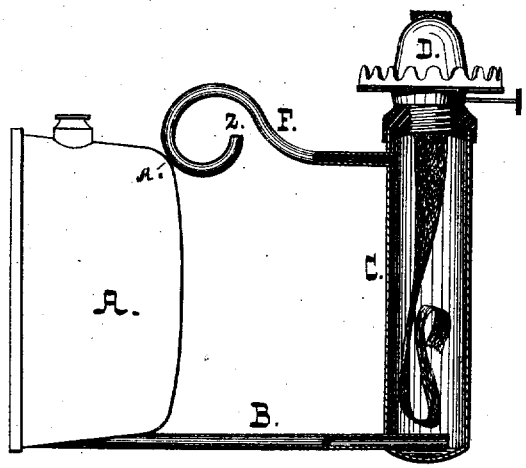
Witnesses,
W. A. Bertram
Dr. L. H. Barclay.
Inventor,
FRANKLIN G. PALMER.
by N. D. Williams.
Attorney.
N. PETERS, PHOTO-LITHOGRAPHER, WASHINGTON, D. C.

UNITED STATES PATENT OFFICE.

FRANKLIN G. PALMER, OF PHILADELPHIA, PENNSYLVANIA, ASSIGNOR OF ONE-HALF TO JASON J. PALMER, OF SAME PLACE, AND SAID JASON J. PALMER ASSIGNOR TO SAID FRANKLIN G. PALMER.

LAMP.

SPECIFICATION forming part of Reissued Letters Patent No. 9,592, dated March 1, 1881.

Original No. 204,364, dated May 28, 1878. Application for reissue filed January 16, 1880.

*To all whom it may concern:*

Be it known that I, FRANKLIN G. PALMER, of the city of Philadelphia, in the county of Philadelphia, State of Pennsylvania, have invented certain new and useful Improvements in Lamps; and I hereby declare the same to be fully, clearly, and exactly described as follows, reference being had to the accompanying drawing, in which a lamp embodying my present invention is illustrated in side elevation, partly in section.

My invention relates to that class of lamps in which the wick-chamber is situated at a distance from the main oil-reservoir, from which it is fed by means of a supply-tube, the design being to isolate the flame from the main body of oil and prevent the heating of the contents of the reservoir and incident evolution of gases which, when mixed with air, are explosive.

The object of my present invention is to furnish the wick-chamber with a vent-tube for the free discharge of any gases at a point remote from the flame, which wick-tube vent shall be of such construction as to prevent the ignition of the contents of the wick-chamber, and to prevent the escape of oil should the lamp be accidentally upset or tilted.

It is well known that ordinary hydrocarbon oils, such as are commonly used for heating or illuminating purposes, while consisting of a number of substances differing in physical characteristics and chemical composition, are almost, if not quite, devoid of oxygen, and require a liberal supply of air to burn at all. The vapor of any constituent of coal-oil or kerosene will, however, when mixed with air in certain proportions, form a highly-explosive mixture. The vent-tube about to be described is designed to afford increased security from danger of explosion, as will appear from the following description of its construction and mode of operation.

In the accompanying drawing, A is the oil-reservoir, B the supply-tube, C the wick-tube, and D the burner, all of the usual construction.

From the upper portion of the wick-tube C leads the vent-tube F, which is curved upward at a distance from the wick-tube, and is then recurved, as shown, forming a partial ring, attached at *a* to the oil-reservoir, the end at *z* being open.

In operation, any gases that are generated in the wick-chamber find egress through the tube F to the open air, and are delivered at a safe distance from the flame.

The length of the tube F, as well as the fact that it is curved up and down, are the features to which the immunity from danger of explosion is due. Of necessity, any air entering the tube is swept out by the gases issuing therefrom, as, be the air heavier or lighter than the particular gas, it cannot traverse the curved pipe. If heavier, it cannot pass the bend. If lighter, it will not enter at all; or, if it did, it could not descend the branch leading directly into the wick-chamber. The peculiar construction of the pipe subserves another and important end. It obviates all danger of spilling the oil as the lamp is carried or accidentally shaken, or even upset. Ample time is afforded in this latter case to replace the lamp before the oil can escape from the curved pipe. The vent-tube serves, furthermore, as an ornamental brace, sustaining the wick-chamber.

I am aware that the oil-reservoirs of lamps have been provided with vent-tubes, straight as well as curved, and such I do not claim; but I am not aware that a lamp having an independent wick-tube has been provided with a recurved vent-tube, as hereinbefore described, which reduces the danger of explosion to a minimum, and, should it by any possibility occur, limits it to the wick-chamber.

An application for design patent for a lamp showing substantially the same configuration as is illustrated in the accompanying drawings has been filed by me.

What I claim is—

1. The combination, with the wick-chamber and independent oil-reservoir, of the supply-tube and recurved vent-tube, venting freely to the outer air, and connecting the wick-chamber and reservoir, as set forth.

2. In combination with the oil-reservoir and independent wick-tube, the supply-pipe, and the recurved vent-tube F *z*, leading from the upper portion of the wick-tube and attached to the oil-reservoir, and subserving the double function of a vent-tube for generated gases and as an ornamental brace for sustaining the wick-tube, as set forth.

FRANKLIN G. PALMER.

Witnesses:

THEO. MUNGEN,

H. CLAY SMITH.